(12) United States Patent
Maeda

(10) Patent No.: US 6,525,763 B1
(45) Date of Patent: Feb. 25, 2003

(54) FILM IMAGE READING DEVICE AND METHOD WITH FOCUS ADJUSTMENT

(75) Inventor: Yukari Maeda, Osaka (JP)

(73) Assignee: Minolta Co., Ltd., Osaka (JP)

(*) Notice: Subject to any disclaimer, the term of this patent is extended or adjusted under 35 U.S.C. 154(b) by 1183 days.

(21) Appl. No.: 08/629,626

(22) Filed: Apr. 9, 1996

(30) Foreign Application Priority Data

Apr. 10, 1995 (JP) .............................................. 7-084198

(51) Int. Cl.[7] .............................................. H04N 5/253
(52) U.S. Cl. .......................................... 348/96; 348/354
(58) Field of Search .............................. 348/96, 97, 98, 348/61, 353, 345–352, 354, 356, 355; H04N 5/253

(56) References Cited

U.S. PATENT DOCUMENTS

| 4,706,124 | A | * | 11/1987 | Baba et al. ................. 348/351 |
|---|---|---|---|---|
| 4,804,831 | A | * | 2/1989 | Baba et al. ................. 348/349 |
| 4,872,058 | A | * | 10/1989 | Baba et al. ................. 348/352 |
| 4,980,773 | A |   | 12/1990 | Suda et al. ................. 348/355 |
| 5,070,408 | A |   | 12/1991 | Kikuchi et al. ............. 348/356 |
| 5,212,516 | A | * | 5/1993 | Yamada et al. ............. 348/354 |
| 5,235,437 | A | * | 8/1993 | Katagiri et al. ............ 348/761 |
| 5,447,811 | A | * | 9/1995 | Buhr et al. .................. 386/42 |
| 5,528,339 | A | * | 6/1996 | Buhr et al. .................. 355/32 |

* cited by examiner

*Primary Examiner*—Young Lee
(74) *Attorney, Agent, or Firm*—Burns, Doane, Swecker & Mathis, LLP

(57) ABSTRACT

A film image reading method includes reading an image on the film to generate image signals, calculating a contrast value based on the image signals, extracting attribute information regarding the film, normalizing a contrast value in accordance with the extracted attribute information, and displaying the normalized contrast value, and a device for effecting the method.

29 Claims, 6 Drawing Sheets

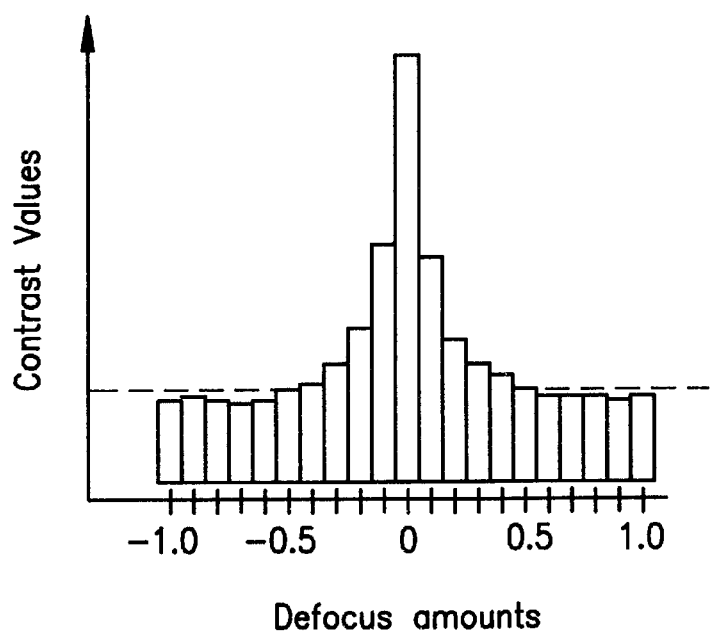
FIG. 6
FIG. 7(a) Contrast Value 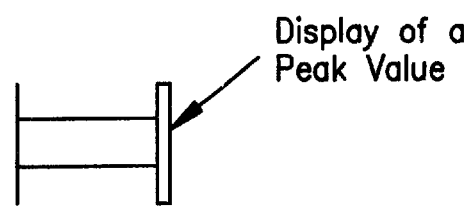
FIG. 7(b) Contrast Value 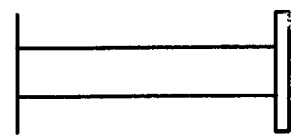
FIG. 7(c) Contrast Value 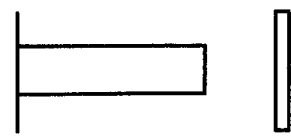

FILM IMAGE READING DEVICE AND METHOD WITH FOCUS ADJUSTMENT

BACKGROUND OF THE INVENTION

1. Field of the Invention

The present invention pertains to a film image reading device that optically reads an image on film, and more particularly, to a film image reading device equipped with a focus detection function to read the image in the optimal focus condition.

2. Description of the Related Art

Conventionally, the following are known as methods of focus detection using image signals from a video camera. U.S. Pat. No. 5,070,408 proposes a method in which signals that are filtered through a low-pass filter (LPF) having the characteristics of the image sensing lens while the lens is not focused are subtracted from the original signals and the remaining signals are integrated so that the contrast is detected. U.S. Pat. No. 4,980,773 proposes a method in which focus detection is performed by sequentially switching multiple band pass filters (BPFs). A device in which contrast detection is performed based on the photo object image signals using a high-pass filter (HPF) is also known.

Among film image reproduction devices that scan and read the image on the film and reproduce the same on a monitor, etc., there are those capable of focus adjustment in order to maintain a good focus condition. In other words, a device of this type can maintain a good focus condition regardless of what method is used to house the film or whether the film is warped. This device evaluates the focus condition by detecting the contrast of the film image, and while doing so it uses a band pass filter (BPF) effective at the frequency range in which the contrast of the image varies most due to defocusing. In general, an image signal exists in a range up to 30 lines/mm. The contrast of the image decreases due to defocusing, with image signals in the frequency range of 10 to 30 lines/mm. Therefore, a BPF is designed such that only image signals included in this range are allowed to pass.

However, in the methods disclosed in U.S. Pat. Nos. 5,070,408 and 4,980,773 and the film image reproduction device above, it is necessary for the device to have a high image signal filtration performance, and therefore a high order LPF or BPF of a design with complex coefficients must be used. Therefore, the construction of the hardware becomes complex, and at the same time, the time required for the calculation of the focus condition increases.

Further, since processing is performed using image signals, the fact that the frequency characteristics vary depending on the type of photo object must be considered as well.

On the other hand, a device in which the calculated value for the focus condition is displayed on a monitor, etc., based on the result of the film image contrast detection is known. This device has a display scale that does not allow a display exceeding the scale even with a relatively large calculated value because the level of the calculated value for the focus condition varies depending on the film's ISO sensitivity and film density. In other words, in the case of a film having a film sensitivity level frequently used in general, the display scale is too large and the display of the calculated value for the focus condition becomes relatively small. On the other hand, in the case of a film having a high ISO sensitivity, the displayed value may be so large that it exceeds the display scale.

OBJECTS AND SUMMARY

A purpose of the present invention is to resolve the problems described above.

Another object of the present invention is to provide a film image reading device equipped with an improved focus detection function.

Yet another object of the present invention is to provide a film image reading device that can easily perform focus detection without using complex hardware.

Yet another object of the present invention is to provide a film image reading device in which the calculation time required for focus detection is reduced. Yet another object of the present invention is to provide a film image reading device that can reliably detect the focus condition regardless of the type of the photo object whose image is on the film.

Yet another object of the present invention is to provide a film image reading device equipped with a monitor that can optimally display the calculated value for the focus condition.

Yet another object of the present invention is to provide a film image reading device equipped with a monitor that can optimally display the calculated value for the focus condition regardless of the type of the film used.

These and other objects are attained by a film image reading device having a reading means that reads the image on the film, an image extracting means that extracts signals caused by the graininess of the film from the image signals read, and a calculating means that calculates the image contrast value based on the signals extracted.

These and other objects are also attained by a film image reading device having an optical system that projects the image on the film, a reading means that reads the image projected by the optical system, a signal extracting means that extracts signals caused by the graininess of the film from the image signals read, a calculating means that calculates the image contrast value based on the signals extracted, a moving means that moves the image along the optical axis of the optical system in a relative fashion, and a control means that moves the image to a position where the optimal contrast value may be obtained in accordance with the contrast value calculated.

These and other objects are also attained by a film image reading device having a reading means that reads the image on the film, a calculating means that calculates the contrast value based on the image signals read, an information extracting means that extracts attribute information regarding the film or the image on the film, a normalization means that normalizes the contrast value in accordance with the attribute information extracted, and a display means that displays the normalized contrast value.

The above-mentioned purposes, and other purposes of this invention, are clearly described in the following description accompanied by the drawings.

BRIEF DESCRIPTION OF THE DRAWINGS

These and other objects and features of the present invention will become apparent from the following description of a preferred embodiment thereof taken in conjunction with the accompanying drawings, in which:

FIG. 6 shows contrast values plotted against defocus amounts;

FIGS. 7(a), 7(b) and 7(c) show contrast value display conditions;

In the following description, like parts are designated by like reference numbers throughout the several drawings.

DETAILED DESCRIPTION OF THE PREFERRED EMBODIMENTS

A preferred embodiment of the present invention is explained below with reference to the drawings.

Figure 1:
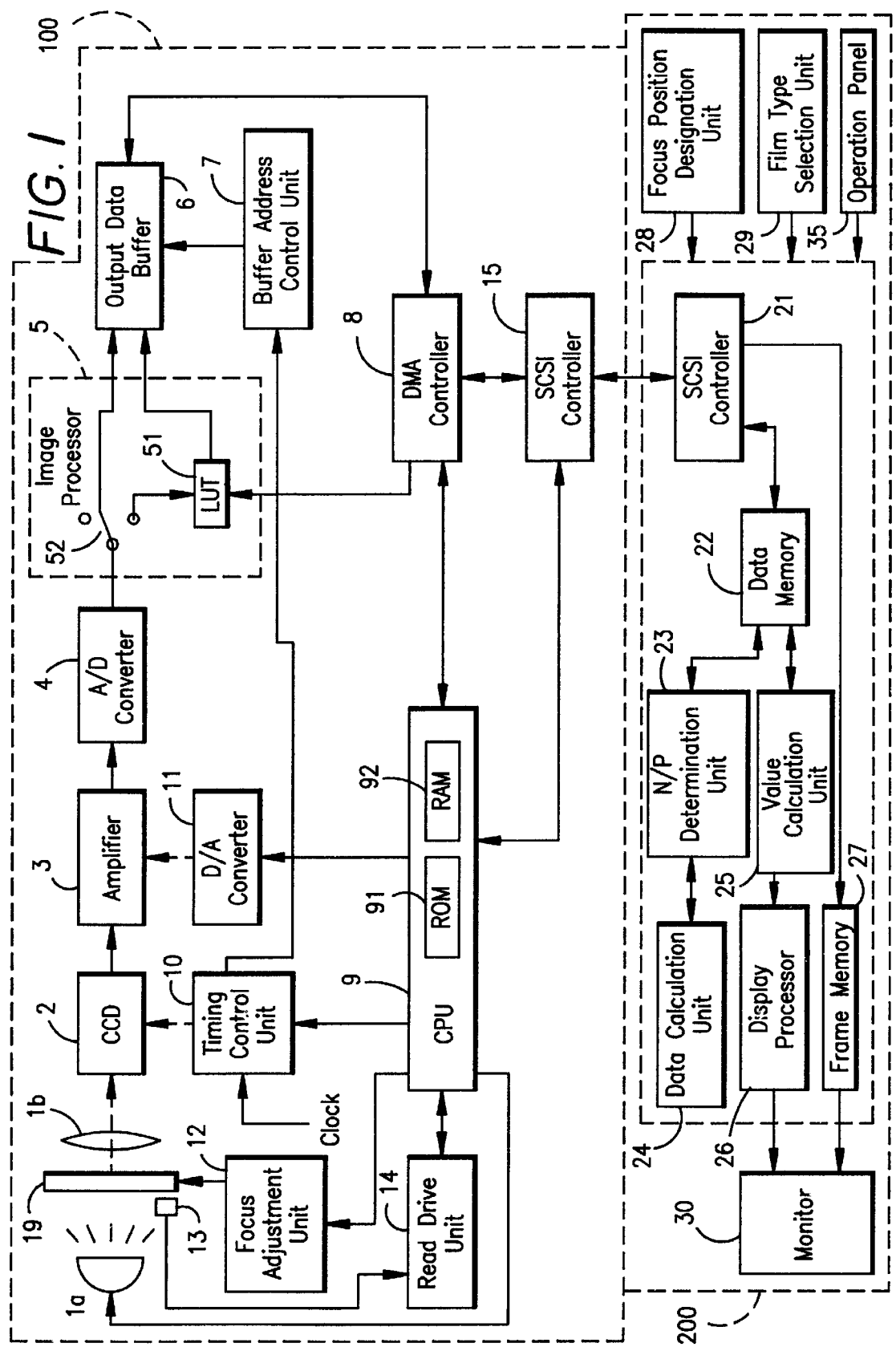
FIG. 1 is a block diagram showing the film image reading device.

FIG. 1 is a block diagram showing the construction of a preferred embodiment of a film image reading device of the present invention. The film image reading device comprises a device main unit 100 and a host computer (hereinafter referred to as 'host PC') 200.

The device main unit 100 comprises a light source 1a, a lens 1b, an image sensing element 2, an amplifier 3, an A/D converter 4, an image processor 5, an output data buffer 6, a buffer address control unit 7, a direct memory access (DMA) controller 8, a CPU 9, a timing control unit 10, a D/A converter 11, a focus adjustment unit 12, a film data reading unit 13, a read drive unit 14 and an SCSI controller 15. The device scans a film 19 set in a film carrier, not shown in the drawing, and reads the image. The film carrier can accommodate various film housings such as mounts, sleeves and cartridges.

The film data reading unit 13 reads the data such as ISO sensitivity that is recorded outside the image recording area of the film 19, or that is indicated on the film spool. The read drive unit 14 causes the film data reading unit 13 to read, and is controlled by instruction signals from the CPU 9.

The light source 1a comprises a fluorescent light, xenon lamp or halogen lamp, for example, and illuminates the film 19. The lens 1b is located on the opposite side of the light source 1a across the film 19 and forms the film image on the image sensing surface of the image sensing element 2. The focus adjustment unit 12 performs focus adjustment by moving the position at which the film 19 is set along the optical axis of lens 1b.

The image sensing element (hereinafter referred to as 'CCD') 2 comprises a color CCD made of R, G and B color filters placed on the light receiving surface of a photoelectric conversion element array such as a photodiode. The CCD 2 converts the optical image of the image of the film 19 formed on the image sensing surface into electrical signals and outputs them as R, G or B image signals. The CCD 2 may also be constructed using an area sensor located on a plane or a line sensor that is located such that it can move parallel to the surface of the film 19.

The amplifier 3 amplifies the R, G and B signals and performs gain adjustment to the R and B signals against the G signals during amplification by means of control signals sent from the CPU 9 via the D/A converter 11. The color balance is adjusted by this gain adjustment. The A/D converter 4 converts analog signals into multi-bit digital signals. The Analog R, G and B image signals are converted into ten-bit or eight-bit digital signals, for example.

The image processor 5 comprises a LUT (look up table) 51 and a switch 52.

The LUT 51 is constructed with a RAM, etc. and performs a negative/positive (N/P) inversion to invert image signals corresponding to a negative image into image signals corresponding to a positive image, as well as conversion of the R, G and B signals. The data in the LUT 51 is set by means of a host PC 200 rewriting the memory contents via the DMA controller 8 and the SCSI controller 15.

The switch 52 performs switching as to whether or not image signals output from the A/D converter 4 are to pass through the LUT 51 when they are output to output data buffer 6. During focus condition detection, the image signals are output directly to the output data buffer 6 without passing through the LUT 51. On the other hand, when the image is input, the image signals are output to the output data buffer 6 after passing through the LUT 51.

The output data buffer 6 is a memory to temporarily store image signals. The buffer address control unit 7 generates read addresses for the transfer of image data from output data buffer 6 to DMA controller 8. DMA controller 8 performs control of the transfer of table data between LUT 51 and SCSI controller 15, as well as control of the transfer of image signal data between output data buffer 6 and SCSI controller 15, based on control signals from CPU 9. SCSI controller 15 performs interface control in the sending and receiving of various data between device main unit 100 and host PC 200 including image signal data. Timing control unit 10 outputs timing signals for CCD 2's accumulation time and the generation of addresses by buffer address control unit 7 based on control signals from CPU 9.

CPU 9 comprises a microcomputer with built-in ROM 91 that stores control programs and built-in RAM 92 that temporarily stores data, for example, and controls the operation of various parts of device main unit 100. In other words, CPU 9 has the following functions (1) through (5), for example.

(1) Scan control during pre-scanning and main scanning of film 19;

(2) Control of the timing signal output by the timing control unit 10 based on the accumulation of time data sent from the host PC 200 via the SCSI controller 15;

(3) Color balance adjustment control of amplifier 3 based on gain adjustment amount data sent from host PC 200 via SCSI controller 15;

(4) Control of the read drive unit 14 for the reading of data recorded on film 19; and (5) Control of the focus adjustment unit 12 for the adjustment of the focus position of film 19.

The host PC 200 comprises SCSI controller 21, data memory 22, N/P determination unit 23, data calculation unit 24, value calculation unit 25, display processor 26, frame memory 27, focus position designation unit 28, film type selection unit 29, operation panel 35 and monitor 30.

SCSI controller 21 performs interface control for the sending and receiving of data between the device main unit 100 and the host PC 200. Data memory 22 temporarily stores data received from device main unit 100 and data to send to device main unit 100. N/P determination unit 23 determines during pre-scanning whether the film 19 set is to negative film or positive film.

Data calculation unit 24 performs calculation regarding image data obtained during pre-scanning. In other words, data calculation unit 24 performs the following processes (6) through (9), for example.

(6) Division of the image sensing area for the film image into a prescribed number of blocks, calculation of the average value for each block from the G signals of the image data obtained during pre-scanning, and detection of the largest value among the average G signal values.

(7) Black balance adjustment to unify the signal levels of R, G and B signals for the block whose average G signal was detected to be the largest.

(8) Calculation of the accumulation time corresponding to the threshold value at which the largest G signal value exceeds the display scale during main scanning.

(9) Calculation of data for the respective colors set in LUT 51 for N/P inversion and γ conversion.

Processes (6) through (8) above are performed in the case of negative film only.

The calculation of data set in LUT 51 for N/P inversion and γ conversion will now be explained. This data calculation is performed by data calculation unit 24.

First, the case where negative film is used will be explained. N/P inversion is performed using the following equations 1 through 3. Image data input to LUT 51 is deemed PXIN and image data output from LUT 51 is deemed PXOUT.

Equation (1)
Where $$O < PX_{IN} \leq \text{foot\_point},$$

$$PX_{OUT} = (A - 1023)/\text{foot\_point } PX_{IN} + 1023$$

Equation (2)

Where $$\text{foot\_point} \leq PX_{IN} \leq \text{knee point},$$

$$PX_{OUT} = 10(\log 10(1023) - \gamma \times \log 10(PX_{IN}) + Ycn)$$

Equation (3)

Where $$\text{knee\_point} < PX_{IN} < 1023, PX_{OUT} = B/(1023 - \text{knee\_point}) \times (1023 - PX_{IN})$$

Provided, however, that A in equation (1) is $PX_{OUT}$ when $PX_{IN}$=foot_point (see point F in FIG. 2), B in equation (3) is $PX_{OUT}$ when $PX_{IN}$=knee_point (see point K in FIG. 2) and ycn in equation (2) is a $PX_{OUT}$ intercept when {γ×log 10($PX_{IN}$)+ycn} passes the table reference point (STx, STy). It is also set so that foot_point =STx−50 and knee_point= 512.

On the other hand, γ (R)=1.375, γ (G)=1.197 and γ (B)=1.197 are used for the respective colors in the γ conversion process.

Figure 2:
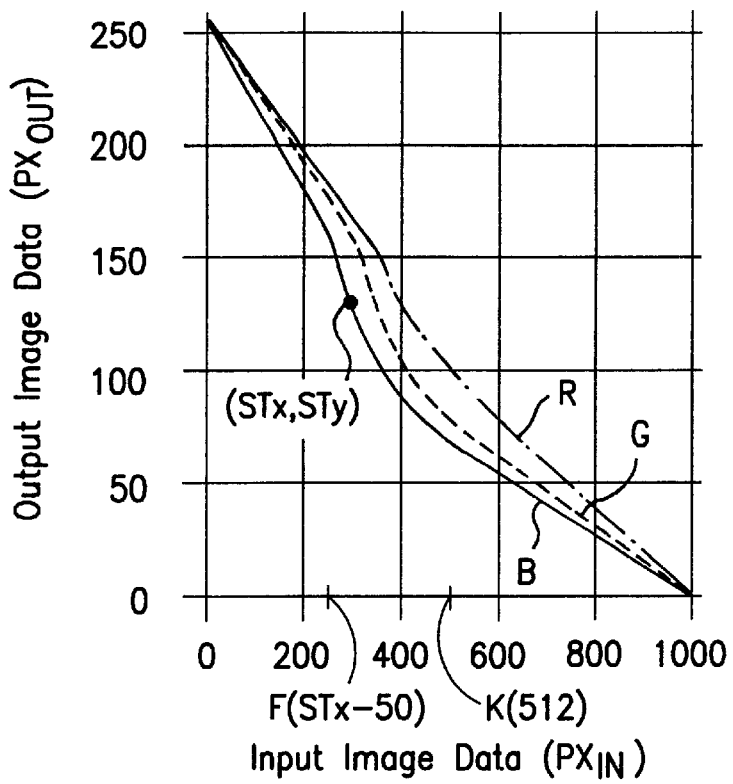
FIG. 2 shows one example of a γ conversion table in the case of negative film.

One example of the conversion table for N/P inversion and γ conversion obtained in the manner above is shown in FIG. 2.

γ conversion in the case of positive film will now be explained. γ conversion is performed using equations (4) and (5). Image data input to LUT 51 is deemed $PX_{IN}$ and image data output from LUT 51 is deemed $PX_{OUT}$.

Equation (4)
Where $$O < PX_{IN} < \text{foot\_point}, PX_{OUT} = 4 \times PX_{IN} \qquad \text{Equation (4)}$$

Equation (5)
Where $$\text{foot\_point} \leq PX_{IN} \leq 1024$$

$$PX_{OUT} = 1023 \times \{(PX_{IN}/1023)^{0.45}\}$$

foot_point is set such that foot_point=82.

Figure 3:
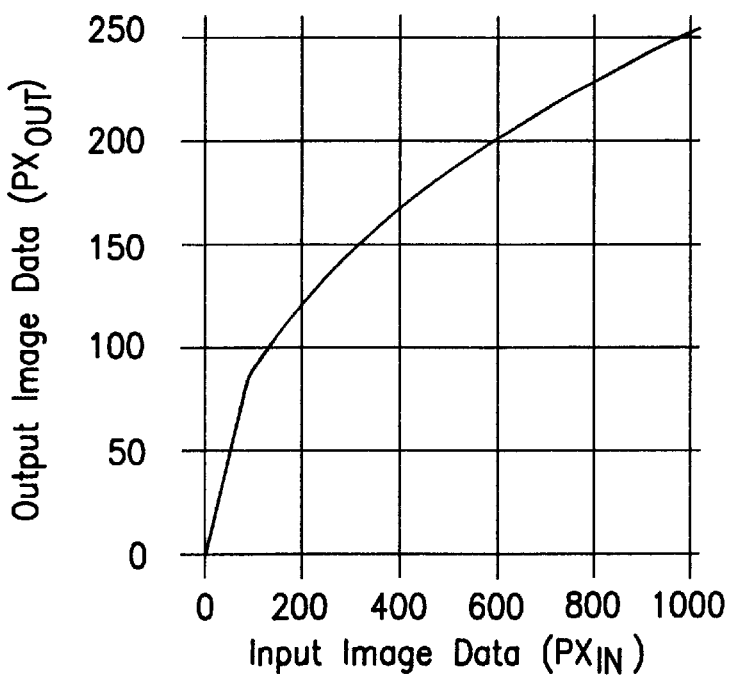
FIG. 3 shows one example of a γ conversion table in the case of positive film.

One example of the conversion table for γ conversion obtained in the manner above is shown in FIG. 3.

As shown from equations (4) and (5), the same equations are used for the respective colors in the case of positive film. The data in the conversion table comprises fixed values. Previously calculated data is stored in RAM 92 such that it is called from RAM 92 when image data is input, and is then set in LUT 51.

Value calculation unit 25 has the following functions (10) through (12).

(10) A function to calculate the image signal input level such that the image data has appropriate amplitude during the calculation to detect the contrast.

(11) A function to detect the contrast based on the film graininess in the high frequency range by filtering the image data read from the contrast detection position.

(12) A function to calculate the display value.

Figure 4:
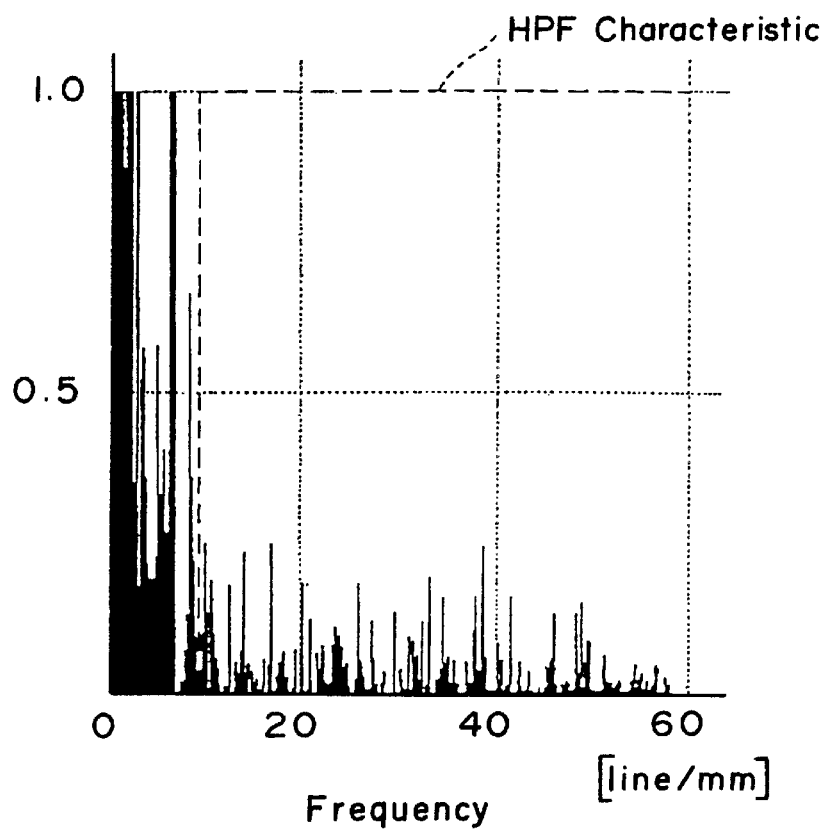
FIG. 4 shows a frequency spectrum for a film image.

As shown in FIG. 4, regarding the frequency characteristics of the signals read, there are signals that are generated from the photo object information and that have very low frequencies (0–10 lines/mm), and signals that are generated from the graininess of film 19 and that have higher frequencies (10–60 lines/mm) regardless of the type of the image. In the case of color film, the image is formed from dye clouds, while in the case of monochrome film, the image is formed from silver particles. In other words, film graininess is the characteristic arising due to such particles forming the film.

Figure 5:
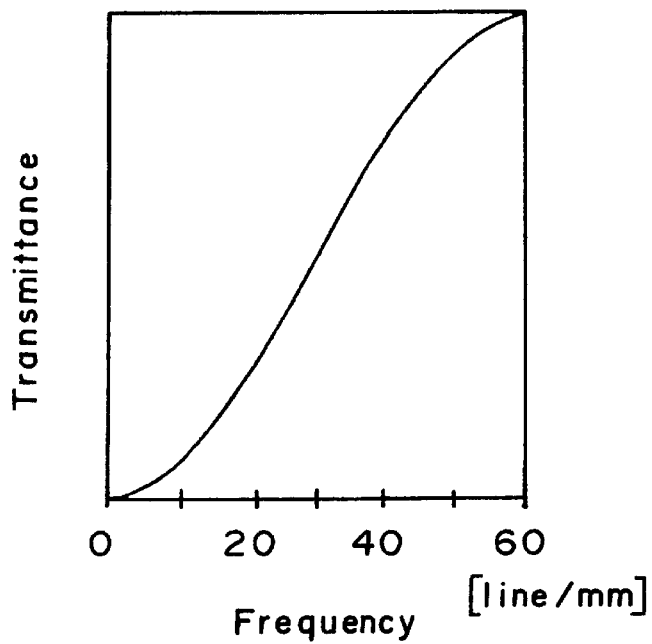
FIG. 5 shows filter characteristics actually used.

Only signals due to graininess that have high frequencies are extracted, and the contrast evaluation value of this range is calculated. When doing so, if the input level is low, the amplitude of the signals is too small to detect the contrast due to graininess. Therefore, the average value of the signals read is calculated, and accumulation time is calculated such that this average value is the median value of the input range. A high pass filter (HPF) having the characteristics indicated by the dotted line in FIG. 4 is desirable for the extraction of the graininess. However, in actuality, a filter shown in FIG. 5 which is of a simple design and which has characteristics similar to those of the HPF that are indicated by a dotted line in FIG. 4 and has coefficients [−1, 2, −1] may be used.

The contrast evaluation value is calculated by taking the absolute values of the data (signals based on the graininess of film 19) obtained through filtering and multiplying all the values. The larger this calculated value is, the larger the contrast of the image is. Therefore, determination of the focus position is possible by seeking the peak value from among the contrast values calculated each time the film position is changed. It is known that the higher the contrast of the image is, the larger the contrast value is. The contrast value peaks at the focus position as shown in FIG. 6, and becomes smaller as the defocus amount increases.

When the defocus amount increases, phase inversion occurs due to limitations in the performance of the lens, in which range the contrast value increase or decrease is reversed. For example, the inclination of the slope of the charted contrast values reverses between defocus amounts '−0.7' and '−0.8'. Therefore, in order to prevent erroneous determination of a peak value, a prescribed threshold value is set as shown in FIG. 6, and a phase inversion process is performed in which data equal to or smaller than this value is discarded.

The display processor 26 displays the contrast value on monitor 30 in the form of a bar, the length of which indicates the size of the value, based on the value calculated by value calculation unit 25. Further, the display processor 26 also displays the peak contrast value using a peak value display mark (PV). The display of the contrast value takes place each time focus adjustment is performed by the focus adjustment unit 12, and the peak value is maintained by the peak value display mark.

In other words, if the film 19 is sequentially moved by the focus adjustment unit 12 from one end of the movement range of the film 19 to the other end, the bar gradually increases in length, and the peak value display mark PV also moves together with the bar (FIGS. 7(*a*), 7(*b*)). If the film 19 is further moved past the focus position, the contrast value calculated decreases, so that the bar becomes shorter while the peak value display mark PV is maintained at the peak position (FIGS. 7(*b*), 7(*c*)).

Where the contrast value is displayed using a bar, the size of the value changes significantly depending on the conditions of the film image. Therefore, the following normalization processes (13) through (15) are performed on the calculated value in accordance with the film information obtained by film data reading unit 13 or input from film type selection unit 29.

(13) Normalization based on the exposure status: Normalization is performed depending on the exposure status when the image of film 19 was photographed. For example, the calculated value is multiplied by 1 in the case of ±0 EV, by the absolute value of the exposure value (2 if −2 EV) in the case of underexposure, and by the reciprocal value of the exposure value (1/2 if +2 EV) in the case of overexposure.

(14) Normalization based on the ISO sensitivity: Normalization is performed based on the ISO sensitivity of film 19. For example, the calculated value is multiplied by 3 if the ISO sensitivity<50, by 1 if 50≦ISO sensitivity<200, by 1/2 if 200≦ISO sensitivity<800, and by 1/3 if 800≦ISO sensitivity.

(15) Conversion into logarithm.

Frame memory 27 saves the image data obtained by the device main unit 100 and displayed on the monitor 30. The monitor 30 comprises a CRT, etc. It reproduces and displays the image as well as the contrast value. The monitor 30 also displays a cursor on the screen. Focus position designation unit 28 specifies the area as to which focus adjustment is desired to be performed by moving the cursor onto the image being displayed on the screen of monitor 30. Film type selection unit 29 is used to manually set the type of film, such as the ISO sensitivity. Operation panel 35 is used by the user to instruct that the reading of the image be commenced. A keyboard, for example, plays the role of operation panel 35.

Figure 8:
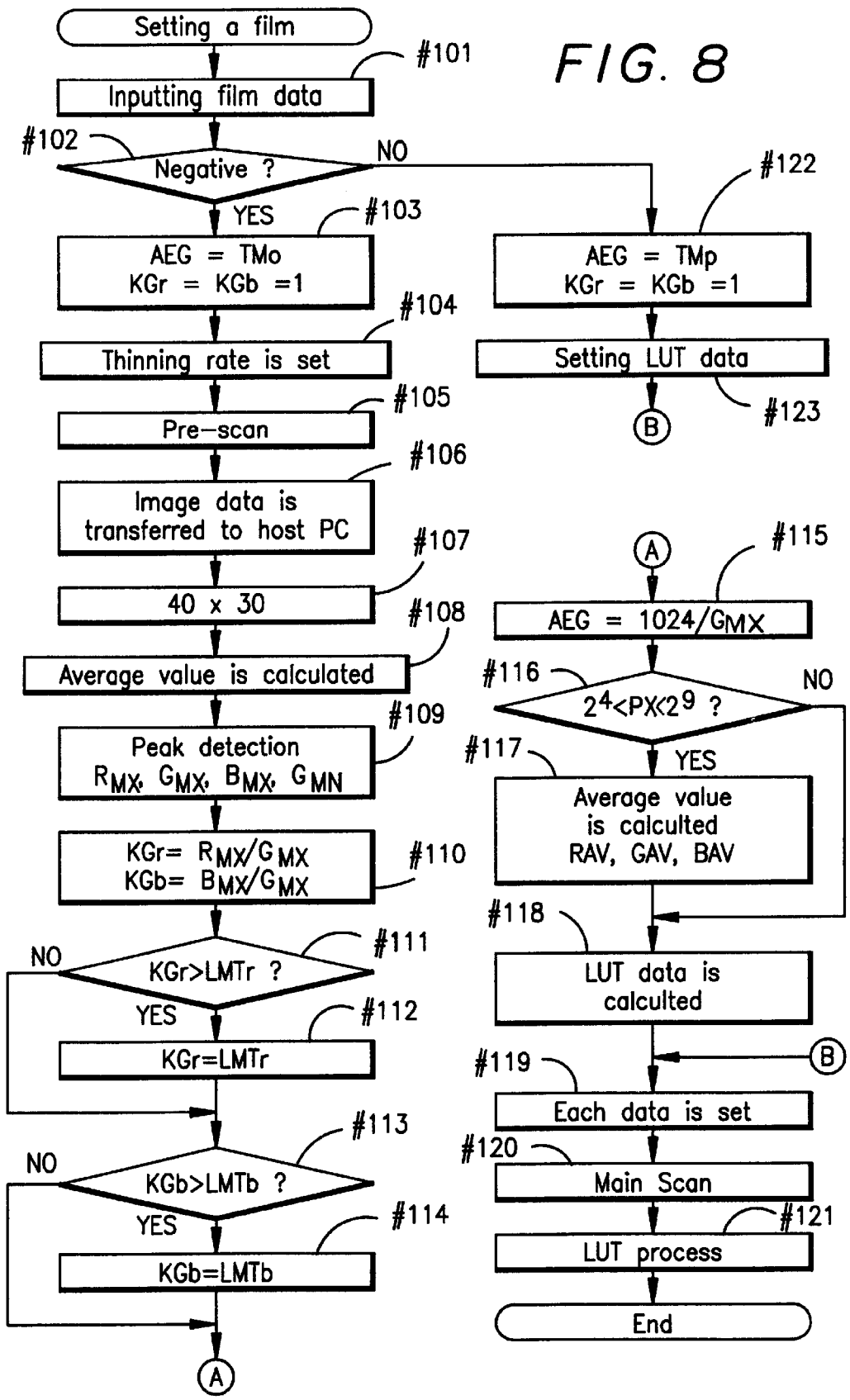
FIG. 8 is a flow chart showing the image reading and reproduction routines.

The sequence of reading and reproduction of the image on film 19 is explained below with reference to the flow chart shown in FIG. 8.

When the film 19 is set at the set position in the device main unit 100, data such as the ISO sensitivity that is recorded on the film 19 is read and saved in the data memory 22 of the host PC 200 (step #101). It is then determined from the data read whether or not the film is negative film (step #102). If it is negative film (YES in step #102), the process advances to step #103, and if it is positive film (NO in step #102), the process advances to step #122.

In step #103, initial input values to perform prescanning are set. In other words, in order to reliably detect the contrast peak with regard to films of major brands, exposure time AEG and gain adjustment amounts KGr and KGb for color balance adjustment at which the density of the base of the film may be input without exceeding the display scale are provisionally set. In this embodiment, they are set such that AEG=TMO and KGr=KGb=1.

The thinning rate is then set (step #104). This is done in order to accelerate the speed of the process to detect the focus position during pre-scanning. For example, if the thinning rate is set at 1/12, image sensing for only one line from among 12 lines is performed, so that the detection of focus position becomes possible using less image data.

Pre-scanning is then commenced (step #105) in order to perform exposure calculation and color balance calculation, and the image data obtained is transferred to the host PC 200 (step #106).

Various calculation processes then take place in the data calculation unit 24 (steps #107–118). First, the largest value of the image data obtained is detected (steps #107–109). Here, the image data input is divided into 30×40 blocks (step #107) in order to avoid influence from noise, etc. and the average value for each block of the image data is calculated (step #108). The largest value among average G signal values is deemed GMX. The block having this maximum value GMX is deemed the black area of the image, and the R signal and the B signal of this block are deemed maximum values RMX and BMX, respectively (step #109). In order to calculate the dynamic range of the image data, detection of the smallest value GMN is also performed with regard to G signals only.

The black balance is then adjusted (steps #110–114) by unifying the signal levels of the largest signal values of the respective colors. First, the gain adjustment amounts are calculated using the ratios of RMX and BMX against GMX (step #110). In doing so, in order to prevent the occurrence of color blurring through excessive adjustment, limit values LMTr and LMTb are set in advance for gain adjustment amounts KGr and KGb, and if gain adjustment amounts KGr and KGb calculated in step #110 exceed limit values LMTr and LMTb (YES in step #111, YES in step #113), these limit values LMTr and LMTb are deemed gain adjustment amounts KGr and KGb (steps #112 and 114).

The threshold value for accumulation time at which the maximum G signal value GMX exceeds the dynamic range and exceeds the display scale during main scanning is calculated (step #115). In this embodiment, since each signal is input using 10 bits, AEG=1024/GMX results.

Data to be set in the LUT 51 for N/P inversion and γ conversion is then calculated for the respective colors (steps #116–118). First, average values RAV, GAV, and BAV of input image data $PX_{IM}$ in the 1%–50% range of the dynamic range of the image data are calculated (step #116). By averaging the image data in the 1%–50% range, the approximate level of brightness at which human skin is photographed may be calculated without being influenced by very dark and light ranges in all types of images. In this embodiment, since image data is input using 10 bits, average values are calculated in the range of $2^4$ (1.6%) through $2^9$ (50%).

Data to be set in the LUT 51 is then calculated based on equations 1 through 3 shown above (step #118). Here while values RAV, GAV and BAV are obtained as average values for the above range in step #116, these average values are obtained as values RAVIN, GAVIN and BAVIN during main scanning. Lines representing equations 1 through 3 pass a table reference point (STx, STy) at which values RAVIN, GAVIN and BAVIN are output as 50% brightness as shown in FIG. 2.

Each data calculated in the sequence described above, i.e., CCD 2 accumulation time AEG, γ conversion table data, color balance gain adjustment amounts KGr and KGb and the thinning rate of 1/12, are transferred to the device main unit 100 from the host PC 200 and are set in the device main unit (step #119).

Main scanning is then performed and image data is input (step #120). N/P inversion and γ conversion are performed in the LUT 51 (step #121), whereupon post-image processing image data is saved in frame memory 27 of the host PC 200 and the process comes to an end.

On the other hand, if it is determined in step #102 that the film is positive film, initial input values for positive film are set (step #122). Because the film density dynamic range of positive film is larger than the CCD 2, it is difficult to cover the entire density range. Therefore, in the setting of initial values, considering the fact that the transmittance at the level of brightness approximately the same as that of human skin is in the lower transmittance range and that the range having a substantially high transmittance is not important in image formation, accumulation time AEG of CCD 2 is set to be TMp such that the output signal of the range having 60% transmittance becomes the largest value within the input data. The color balance gain adjustment amounts KGr and KGb are set such that KGr=KGb=1. The thinning rate is set at 1/12, as in the case of negative film, for example.

The γ conversion table data for positive film stored in the RAM 92 is then set in the LUT 51 (step #123).

Main scanning is then performed, and image data is input (step #120). γ conversion is performed in the LUT 51 (step #121), whereupon post-image processing image data is saved in the frame memory 27 of the host PC 200 and the process comes to an end.

Figure 9:
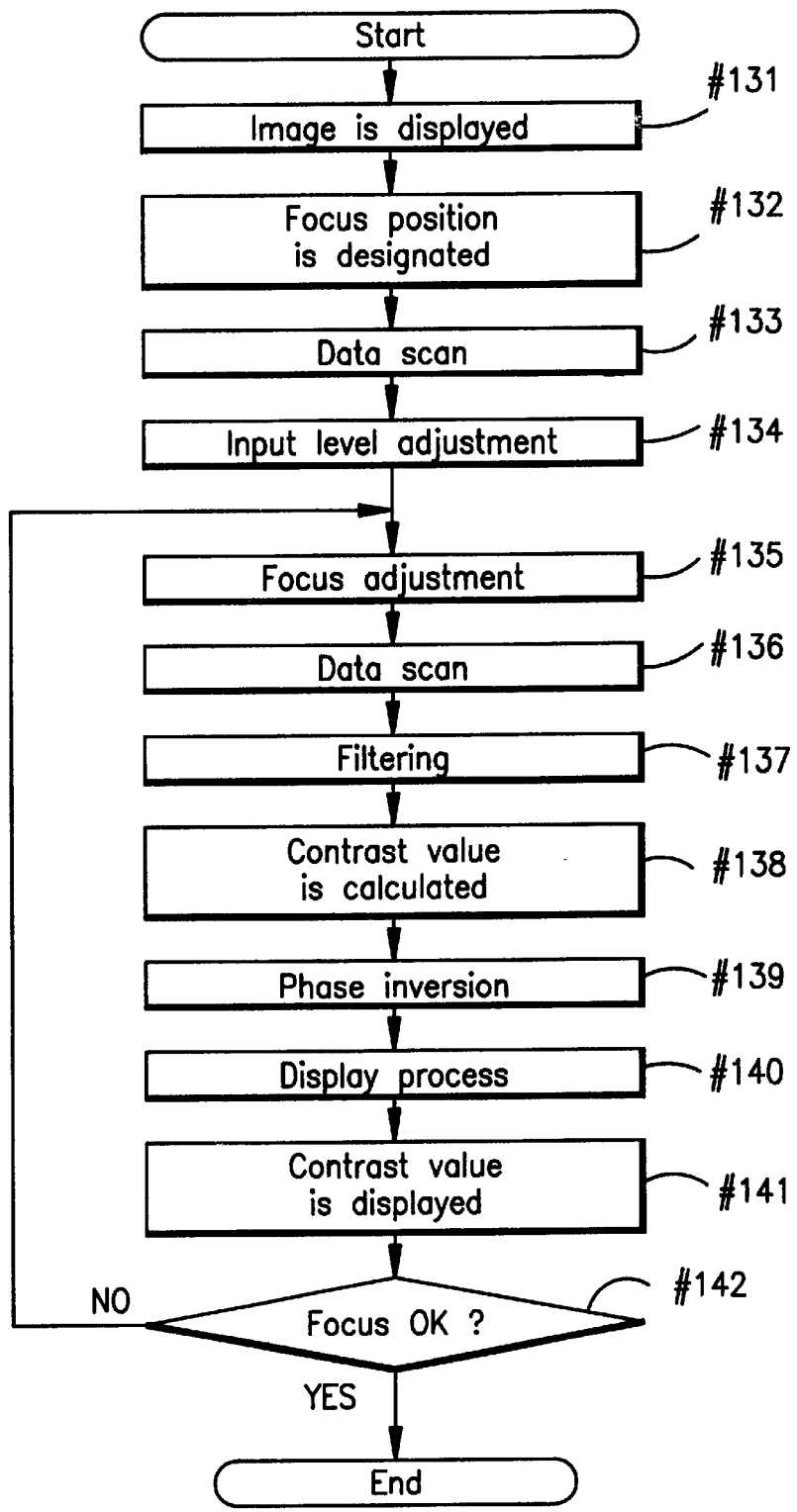
FIG. 9 is a flow chart showing the focus detection routine.

One example of the sequence of the contrast detection operation for focus adjustment is explained below with reference to the flow chart shown in FIG. 9.

The image data stored in frame memory 27 is first displayed on monitor 30 (step #131). Then, using focus position designation unit 28, the desired focus position in the image as to which focusing is adjusted is designated with a cursor displayed on the screen of monitor 30 (step #132). Where CCD 2 is a line sensor, CCD 2 is moved to the line that includes the position designated in step #132, and scanning is performed centering on the designated focus position. The image data obtained is then transferred to data memory 22 of host PC 200 (step #133). Here, since one-dimensional image data is sufficient for the detection of contrast, G signals for only one line (256 pixels, for example) should be read. Where CCD 2 is an area sensor, image data as to the designated focus position only should be transferred to host PC 200 from output data buffer 6.

Input level adjustment is then performed by value calculation unit 25 (step #134). The position at which film 19 is set is moved to one end of the movement range by means of focus adjustment unit 12 (step #135) and data scanning is performed again using the adjusted input level (step #136). The image data is filtered by the value calculation unit 25, and high frequency components due to the graininess of the film 19 are extracted (step #137). The contrast value is then calculated by multiplying the absolute values of the filtered image data (step #138). Phase inversion is then performed (step #139).

Display processing such as process (13), i.e., normalization based on the exposure status, process (14), i.e., normalization based on the ISO sensitivity and process (15), i.e., conversion into a logarithm, or in other words, normalization for display purposes, is then performed (step #140). Furthermore, the contrast value is displayed in the form of a bar (step #141). It is then determined whether the peak value was displayed in step #141, or in other words, whether comparison with the previous peak value was performed and the focus position was achieved (step #142). If it is determined that the focus position was achieved (YES in step #142), the process comes to an end, and if it is determined that the focus position was not achieved (NO in step #142), the position at which film 19 is set is moved toward the other end by a prescribed pitch (step #133). Steps #134–141 are repeated until the focus position is achieved.

As described above, because the contrast is detected by extracting only the signals of high frequency components due to film graininess from among the image signals of film 19, the contrast can be detected with a simple construction using a simple HPF without incorporating a complex filter circuit. Therefore, the contrast can be detected in a very short period of time even if all processing is performed through software. In addition, since the signals due to the film's graininess are used, contrasts of all types of film images can be detected without receiving the influence of the photo object's frequency characteristics.

Furthermore, since the contrast value is calculated using signals generated due to the graininess of film 19, the level of the calculated value is influenced by the image's graininess. Moreover, the more overexposure there is during photo-taking or the smaller the ISO sensitivity of film 19 is, the finer this graininess of the image becomes. The calculated value changes substantially in comparison with the amount of change of the contrast value due to defocusing. However, in the present invention, the calculation process for display purposes is changed based on the attribute information regarding the film image, such as the ISO sensitivity of film 19 and information regarding the exposure conditions during photo-taking, as explained in regard to processes (13) and (14) above. Therefore, the calculated value receives as little influence from the graininess of the image as possible.

Since the logarithmic conversion of the calculated contrast value, as explained under process (15) above, can replace processes (13) and (14), even where film information is not obtained, the same effect that can be achieved through processes (13) and (14) can be obtained through the logarithmic compression of the display scale.

Processes (13) through (15) may be performed individually or in combination. Where the ISO sensitivity of film 19 is 800 or larger, for example, process (15) only may be performed. Depending on the film information, both processes (13) and (14) may be performed.

As explained above, because signals generated due to film graininess are extracted from among the image signals and the contrast evaluation value of the film image is calculated from the extracted signals, the contrast evaluation value of the film image can be calculated accurately without influence from the photo object, in a very short period of time, using a simple construction, regardless of the type of the photo object.

In addition, since the attribute information regarding the film image is identified and the contrast evaluation value is displayed on the monitor after normalization is performed depending on the attribute information identified, the contrast evaluation value can be displayed using the optimal display scale at all times in accordance with attribute information such as the film's ISO sensitivity and exposure conditions during photo-taking.

The present invention may be applied in a device having a construction in which the film is manually moved by the user to a position at which the optimal contrast may be obtained while viewing the bar and peak value display mark displayed on the monitor, or in a device having a construction in which the film is automatically moved such that the optimal contrast may be obtained. In order to obtain the optimal contrast, the optical system such as the lenses may be moved instead of the film, or both the film and optical system may be moved.

Although the present invention has been fully described by way of examples with reference to the accompanying drawings, apparent to those skilled in the art. Therefore, unless otherwise such changes and modifications depart from the scope of the present invention, they should be construed as being included therein.

What is claimed is:

1. A film image reading method, comprising:
   reading the film image to create image signals,
   extracting signals caused by a graininess of the film from the image signals read, wherein film graininess is a characteristic attributed to particles forming the film,
   calculating an image contrast value based on the signals extracted, and
   adjusting a focus of the film using said image contrast value.

2. The method of claim 1, where in the extracted signals are the high frequency components of the image signals.

3. The method of claim 1, wherein the calculating step includes multiplying the absolute values of the extracted signals.

4. The method of claim 1, wherein the adjusting step includes comparing a current contrast value with a previous peak value to determine a maximum contrast value.

5. The method of claim 4, wherein the adjusting step includes selecting a focus position corresponding to the maximum contrast value.

6. The method of claim 1, wherein said extracting step extracts only said signals caused by a graininess of the film.

7. The method of claim 1, wherein said extracting step extracts signals which exclude influence from a photo object's frequency characteristic.

8. The method of claim 1, wherein the signals extracted corresponding to the graininess of the film are in the range of 10–60 lines/mm.

9. A film image reading method, comprising:
   projecting an image on the film with an optical system,
   reading the image projected by the optical system to generate image signals,
   extracting signals from the image signals that are caused by a graininess of the film, wherein film graininess is a characteristic attributed to particles forming the film,
   calculating an image contrast value based on the signals extracted, and
   moving the image along an optical axis of the optical system position where an optimal contrast value may be obtained in accordance with the calculated image contrast value.

10. The method of claim 9, wherein the extracted signals are the high frequency components of the image signals.

11. The method of claim 9, wherein the calculating step includes multiplying the absolute values of the extracted signals.

12. The method of claim 9, wherein the moving step includes comparing a current contrast value with a previous peak value to determine a maximum contrast value.

13. The method of claim 12, wherein the moving step includes selecting a focus position corresponding to the maximum contrast value.

14. The method of claim 9, wherein said extracting step extracts only said signals caused by a graininess of the film.

15. The method of claim 9, wherein said extracting step extracts signals which exclude influence from a photo object's frequency characteristic.

16. The method of claim 9, wherein the signals extracted corresponding to the graininess of the film are in the range of 10–60 lines/mm.

17. A film image reading method, comprising:
   reading an image on the film to generate image signals,
   calculating a contrast value based on the image signals,
   extracting attribute information regarding the film,
   normalizing a contrast value in accordance with the extracted attribute information, and
   displaying the normalized contrast value.

18. The method of claim 17, further comprising a step of comparing a current contrast value with a previous peak value to determine a maximum contrast value.

19. The method of claim 18, further comprising a step of selecting a focus position corresponding to the maximum contrast value.

20. The method of claim 17, wherein the attribute information includes a sensitivity of the film.

21. The method of claim 20, wherein the attribute information includes information regarding exposure conditions during photo-taking.

22. The method of claim 17, wherein the normalizing step reduces any influence of the graininess of the film when determining the calculated value.

23. A film image reading device, comprising:
   an optical system that projects a film image;
   means for reading the image projected by the optical system to create image signals;
   signal extracting means for extracting signals caused by a graininess of the film from the image signals read, wherein film graininess is a characteristic attributed to particles forming the film,
   means for calculating an image contrast value based on the signals extracted,
   means for moving the film image along an optical axis of the optical system, and
   control means that moves the image to a position where an optimal contrast value may be obtained in accordance with the image contrast value calculated.

24. The film image reading device of claim 23, further comprising means for inputting attribute information concerning the film image.

25. The film image reading device of claim 23, wherein the reading means includes a color CCD having R, G, and B color filters.

26. The film image reading device of claim 23, wherein the signal extracting means includes a filter for extracting high frequency signals.

27. The film reading device of claim 23, wherein said signal extracting means extracts only said signals caused by a graininess of the film.

28. The film reading device of claim 23, wherein said extracting means extracts signals which exclude influence from a photo object's frequency characteristic.

29. The film reading device of claim 23, wherein the signals extracted corresponding to the graininess of the film are in the range of 10–60 lines/mm.

\* \* \* \* \*